(12) United States Patent
Tseng

(10) Patent No.: US 12,251,778 B2
(45) Date of Patent: Mar. 18, 2025

(54) TIG WELDING FLUX FOR CHROMIUM-MOLYBDENUM STEEL AND METHOD FOR USING THE SAME

(71) Applicant: NATIONAL PINGTUNG UNIVERSITY OF SCIENCE & TECHNOLOGY, Pingtung County (TW)

(72) Inventor: Kuang-Hung Tseng, Pingtung County (TW)

(73) Assignee: NATIONAL PINGTUNG UNIVERSITY OF SCIENCE & TECHNOLOGY, Pingtung County (TW)

( * ) Notice: Subject to any disclaimer, the term of this patent is extended or adjusted under 35 U.S.C. 154(b) by 322 days.

(21) Appl. No.: 17/866,604

(22) Filed: Jul. 18, 2022

(65) Prior Publication Data

US 2023/0075999 A1 Mar. 9, 2023

(30) Foreign Application Priority Data

Sep. 3, 2021 (TW) .................................. 110132854

(51) Int. Cl.
*B23K 35/36* (2006.01)
*B23K 35/365* (2006.01)

(52) U.S. Cl.
CPC ........ *B23K 35/365* (2013.01); *B23K 35/3607* (2013.01)

(58) Field of Classification Search
CPC .............. B23K 35/365; B23K 35/3607; B23K 35/362; B23K 26/34
See application file for complete search history.

(56) References Cited

U.S. PATENT DOCUMENTS

| 2010/0288397 | A1* | 11/2010 | Tseng | ..................... | B23K 35/34 |
| | | | | | 148/26 |
| 2015/0132173 | A1* | 5/2015 | Bruck | ..................... | B23K 26/14 |
| | | | | | 219/76.14 |
| 2016/0167178 | A1* | 6/2016 | Tseng | ................. | B23K 35/3608 |
| | | | | | 148/24 |
| 2017/0266748 | A1* | 9/2017 | Tseng | ................. | B23K 35/3605 |
| 2019/0030636 | A1* | 1/2019 | Mukai | ................ | B23K 35/3607 |

FOREIGN PATENT DOCUMENTS

WO   WO-0059674 A1 * 10/2000 ............. B23K 35/36

\* cited by examiner

*Primary Examiner* — David P Turocy
*Assistant Examiner* — Targe Walker Loyd
(74) *Attorney, Agent, or Firm* — WPAT, PC

(57) ABSTRACT

A TIG welding flux for chromium-molybdenum steel is used to form a weld bead with high mechanical strength and high fracture toughness between two chromium-molybdenum steel workpieces. The TIG welding flux for chromium-molybdenum steel includes 30-44 wt % of silicon dioxide ($SiO_2$), 20-35 wt % of manganese(IV) oxide ($MnO_2$), 14-24 wt % of chromium(III) oxide ($Cr_2O_3$), 9-19 wt % of nickel (III) oxide ($Ni_2O_3$), 7-14 wt % of molybdenum trioxide ($MoO_3$) and 5-10 wt % of calcium fluoride ($CaF_2$).

7 Claims, 4 Drawing Sheets

TIG WELDING FLUX FOR CHROMIUM-MOLYBDENUM STEEL AND METHOD FOR USING THE SAME

CROSS REFERENCE TO RELATED APPLICATIONS

The application claims the benefit of Taiwan application serial No. 110132854, filed Sep. 3, 2021, the entire contents of which are incorporated herein by reference.

BACKGROUND OF THE INVENTION

1. Field of the Invention

The present invention generally relates to a welding flux and, more particularly, to a tungsten inert gas (TIG) welding flux for chromium-molybdenum steel.

2. Description of the Related Art

Chromium molybdenum steel indicates the mechanical structural alloy steel mainly including the elements such as manganese (Mn), chromium (Cr) and molybdenum (Mo). Chromium molybdenum steel for manufacturing mechanical components has excellent mechanical strength, fracture toughness and fatigue limit, and also has great weldability, castability, forgeability and machinability.

Moreover, chromium molybdenum steel has great creep strength even under a relative high temperature (such as under a temperature ranging from 400° C. to 500° C.), and can be used to manufacture the mechanical components to be used under high temperature and high pressure. Therefore, the welding process should be adjusted according to the chromium molybdenum steel to be used, forming a weld bead with high mechanical strength and high fracture toughness, and preventing from the brittle fracture of the weld bead.

In light of this, it is necessary to provide a welding flux for chromium-molybdenum steel that can be used with tungsten inert gas (TIG) welding procedure.

SUMMARY OF THE INVENTION

It is therefore an objective of the present invention to provide a tungsten inert gas (TIG) welding flux for chromium-molybdenum steel that can be used with TIG welding procedure to form a deep, narrow weld bead between two jointed workpieces.

One embodiment of the present invention discloses the TIG welding flux for chromium-molybdenum steel. The TIG welding flux for chromium-molybdenum steel can include 30-44 wt % of silicon dioxide ($SiO_2$), 20-35 wt % of manganese(IV) oxide ($MnO_2$), 14-24 wt % of chromium(III) oxide ($Cr_2O_3$), 9-19 wt % of nickel(III) oxide ($Ni_2O_3$), 7-14 wt % of molybdenum trioxide ($MoO_3$) and 5-10 wt % of calcium fluoride ($CaF_2$).

Accordingly, the TIG welding flux for chromium-molybdenum steel according to the present invention can be used with TIG welding procedure, and thus the two chromium-molybdenum steel workpieces can be jointed to form two jointed workpieces. The weld bead between the two jointed workpieces has a weld D/W ratio (weld depth/bead width ratio) more than or equal to 0.8. Therefore, heat-affected zone (HAZ) formed in the two chromium-molybdenum steel workpieces is reduced, decreasing the risk of thermal deformation and residual stress of the two jointed workpieces. In addition, for thicker workpieces (such as that with a thickness above 3 mm), the formation of bevel faces of the two chromium-molybdenum steel workpieces can also be omitted, solving the problems such as the decrease of mechanical strength and the large HAZ due to the formation of the bevel faces of the two chromium-molybdenum steel workpieces. Moreover, omitting the formation of the bevel faces of the two chromium-molybdenum steel workpieces can also reduce welding time and manufacturing costs.

In preferred form shown, the TIG welding flux for chromium-molybdenum steel can have a plurality of powdered particles each having a diameter of 50-90 μm. With such performance, the plurality of powdered particles can form a homogeneous mixture with great uniformity. As such, the TIG welding flux for chromium-molybdenum steel can be easily spread on surfaces of the two chromium-molybdenum steel workpieces. Also, the TIG welding flux for chromium-molybdenum steel can be easily melted by a heat source, and the weld D/W ratio can therefore be increased.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
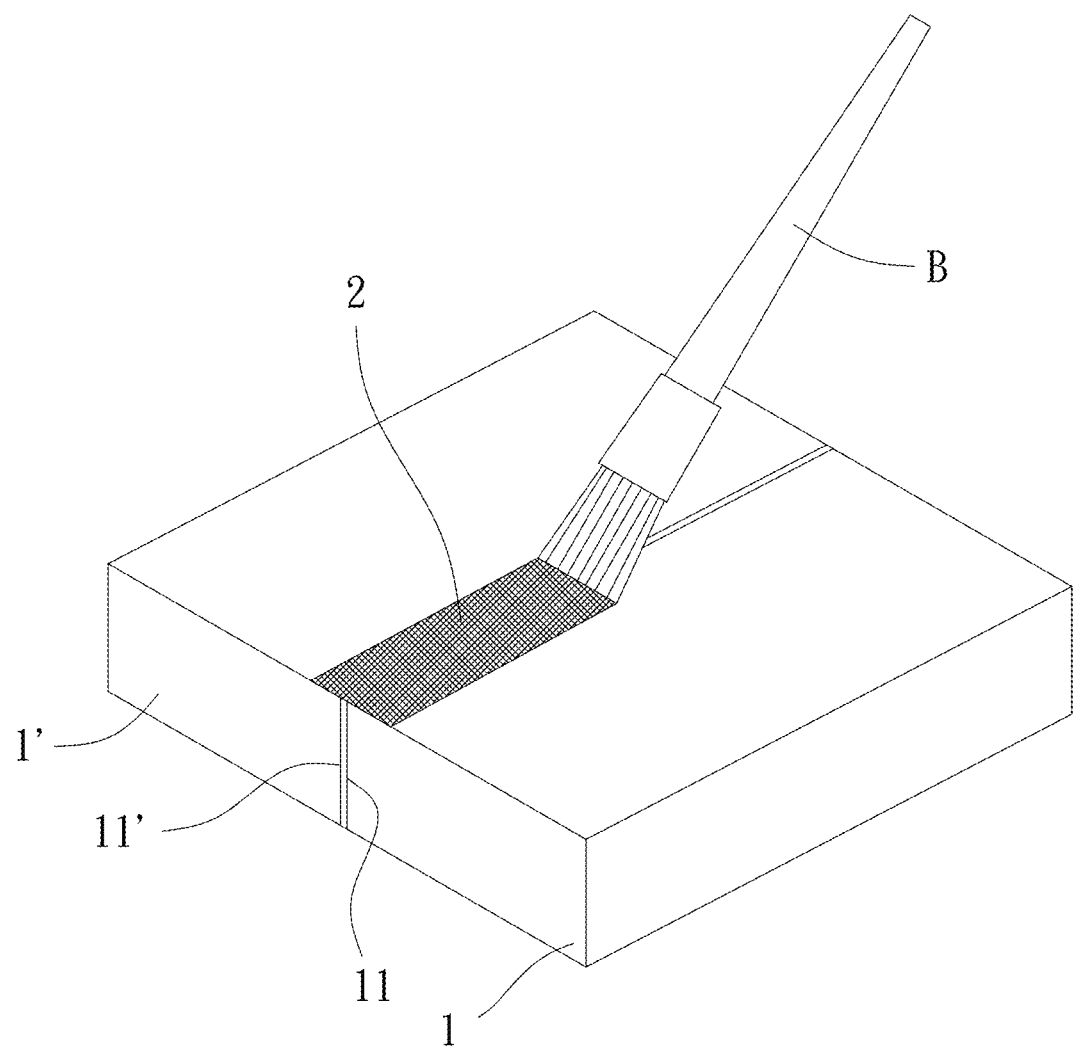
FIG. 1 depicts a schematic diagram showing a TIG welding flux for chromium-molybdenum steel according to the present invention spreading on surfaces of chromium-molybdenum steel workpieces to be joined by the TIG welding process.

A TIG welding flux for chromium-molybdenum steel according to a specific embodiment of the present invention that can be used with tungsten inert gas (TIG) welding procedure to join two chromium-molybdenum steel workpieces.

Specifically, the chromium-molybdenum steel workpiece can be a mechanical structural alloy steel workpiece made of JIS SCM 430 (AISI 4130) steel, a mechanical structural alloy steel workpiece made of JIS SCM 435 (AISI 4135) steel, a mechanical structural alloy steel workpiece made of JIS SCM 440 (AISI 4140) steel, or a mechanical structural alloy steel workpiece made of JIS SCM 445 (AISI 4145) steel. Also, the chromium-molybdenum steel workpiece can be a mechanical structural alloy steel workpiece made of other alloy steel including the elements of manganese, chromium and molybdenum, which can be appreciated by a person having ordinary skill in the art.

The mechanical structural alloy steel workpiece used in this embodiment is made of JIS SCM 435 (AISI 4135) steel, and includes 0.33-0.38 wt % of carbon (C), 0.15-0.35 wt % of silicon (Si), 0.60-0.85 wt % of manganese (Mn), ≤0.03 wt % of phosphorus (P), ≤0.03 wt % of sulfur (S), 0.9-1.2 wt % of chromium (Cr), 0.15-0.30 wt % of molybdenum (Mo), ≤0.3 wt % of cupper (Cu), the balance is iron (Fe; about 97.33-97.87 wt %).

The TIG welding flux for chromium-molybdenum steel can include silicon dioxide ($SiO_2$), manganese(IV) oxide ($MnO_2$), chromium(III) oxide ($Cr_2O_3$), nickel(III) oxide ($Ni_2O_3$), molybdenum trioxide ($MoO_3$) and calcium fluoride ($CaF_2$).

Specifically, the TIG welding flux for chromium-molybdenum steel can include 30-44 wt % of silicon dioxide ($SiO_2$), 20-35 wt % of manganese(IV) oxide ($MnO_2$), 14-24 wt % of chromium(III) oxide ($Cr_2O_3$), 9-19 wt % of nickel (III) oxide ($Ni_2O_3$), 7-14 wt % of molybdenum trioxide ($MoO_3$) and 5-10 wt % of calcium fluoride ($CaF_2$). With such performance, when the TIG welding procedure is carried out with the TIG welding flux for chromium-molybdenum steel, the weld bead formed between the two chromium-molybdenum steel workpieces has a higher weld D/W ratio more than or equal to 0.8. Moreover, HAZ formed between the two chromium-molybdenum steel workpieces are reduced, decreasing the risk of thermal deformation and residual stress of the two jointed workpieces.

Besides, the TIG welding flux for chromium-molybdenum steel can have a plurality of powdered particles each having a diameter of 50-90 μm. With such performance, the plurality of powdered particles can form a homogeneous mixture with great uniformity. As such, the TIG welding flux for chromium-molybdenum steel can be easily spread on surfaces of the two chromium-molybdenum steel workpieces. Also, the TIG welding flux for chromium-molybdenum steel can be easily melted by a heat source, and the weld D/W ratio can therefore be increased.

To validate whether the weld bead with a higher weld D/W ratio can be formed between the two chromium-molybdenum steel workpieces by the TIG welding procedure utilizing the TIG welding flux for chromium-molybdenum steel of the present invention, the following trials are carried out.

Trial (A).

After mixing 25 wt % of silicon dioxide ($SiO_2$), 15 wt % of manganese(IV) oxide ($MnO_2$), 25 wt % of chromium(III) oxide ($Cr_2O_3$), 20 wt % of nickel(III) oxide ($Ni_2O_3$), 5 wt % of molybdenum trioxide ($MoO_3$) and 10 wt % of calcium fluoride ($CaF_2$), the mixture is formed as a paste-like slurry by acetone, obtaining the TIG welding flux of group A01. The TIG welding fluxes of groups A02-A14 are manufactured following the same procedure, and the weight percentage of $SiO_2$, $MnO_2$, $Cr_2O_3$, $Ni_2O_3$, $MoO_3$ and $CaF_2$ are shown in TABLE 1.

TABLE 1

| Group | $SiO_2$ | $MnO_2$ | $Cr_2O_3$ | $Ni_2O_3$ | $MoO_3$ | $CaF_2$ |
|---|---|---|---|---|---|---|
| A01 | 25 | 15 | 25 | 20 | 5 | 10 |
| A02 | 25 | 19 | 13 | 18 | 15 | 10 |
| A03 | 28 | 18 | 26 | 15 | 6 | 7 |
| A04 | 29 | 15 | 28 | 8 | 6 | 14 |

TABLE 1-continued

| Group | $SiO_2$ | $MnO_2$ | $Cr_2O_3$ | $Ni_2O_3$ | $MoO_3$ | $CaF_2$ |
|---|---|---|---|---|---|---|
| A05 | 35 | 16 | 14 | 10 | 15 | 10 |
| A06 | 35 | 35 | 10 | 7 | 6 | 7 |
| A07 | 40 | 17 | 25 | 8 | 5 | 5 |
| A08 | 45 | 10 | 12 | 12 | 13 | 8 |
| A09 | 29 | 19 | 13 | 6 | 20 | 13 |
| A10 | 30 | 20 | 14 | 19 | 7 | 10 |
| A11 | 32 | 20 | 15 | 13 | 14 | 6 |
| A12 | 31 | 24 | 24 | 9 | 7 | 5 |
| A13 | 30 | 35 | 14 | 9 | 7 | 5 |
| A14 | 44 | 20 | 14 | 9 | 8 | 5 |

Trial (B).

In this trial, two chromium-molybdenum steel plate with thickness of 10.0 mm are used as the two chromium-molybdenum steel workpieces 1, 1'. After removing contaminants attached on the surface of the two chromium-molybdenum steel plate using a 200-grit silicon carbide (SiC) sandpaper, the two chromium-molybdenum steel plate are swiped by acetone wipes.

Then, referring to FIG. 1, the paste-like slurries formed by the TIG welding fluxes 2 of groups A01-A14 are spread on the surface of the two chromium-molybdenum steel workpieces 1, 1' by a brush B. The TIG welding procedure is carried out after acetone is completely evaporated, the TIG welding process (double-sided butt welding) is carried out.

Figure 2:
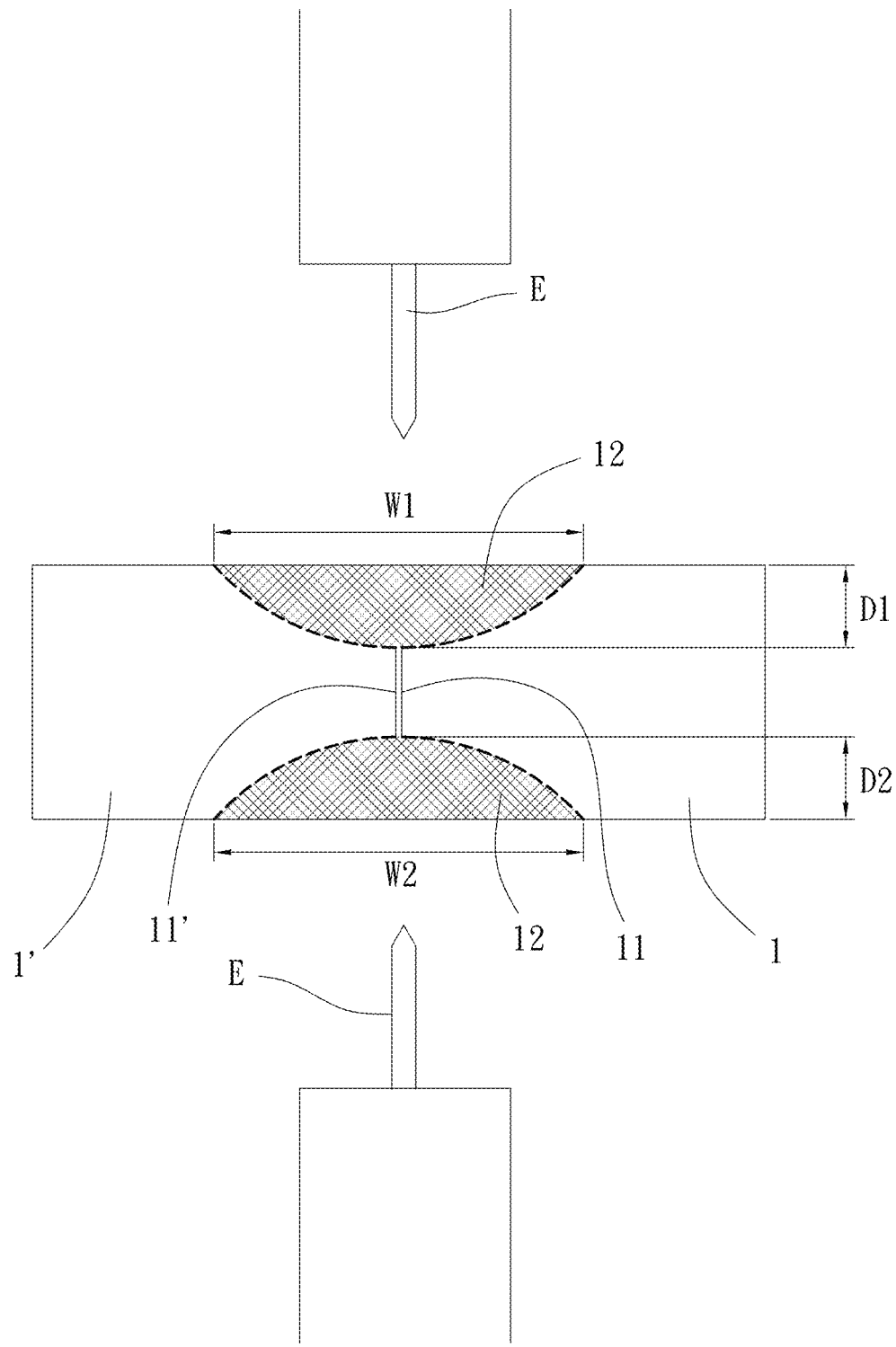
FIG. 2 depicts a schematic diagram showing two jointed workpieces formed by double-sided butt welding.
Figure 3:
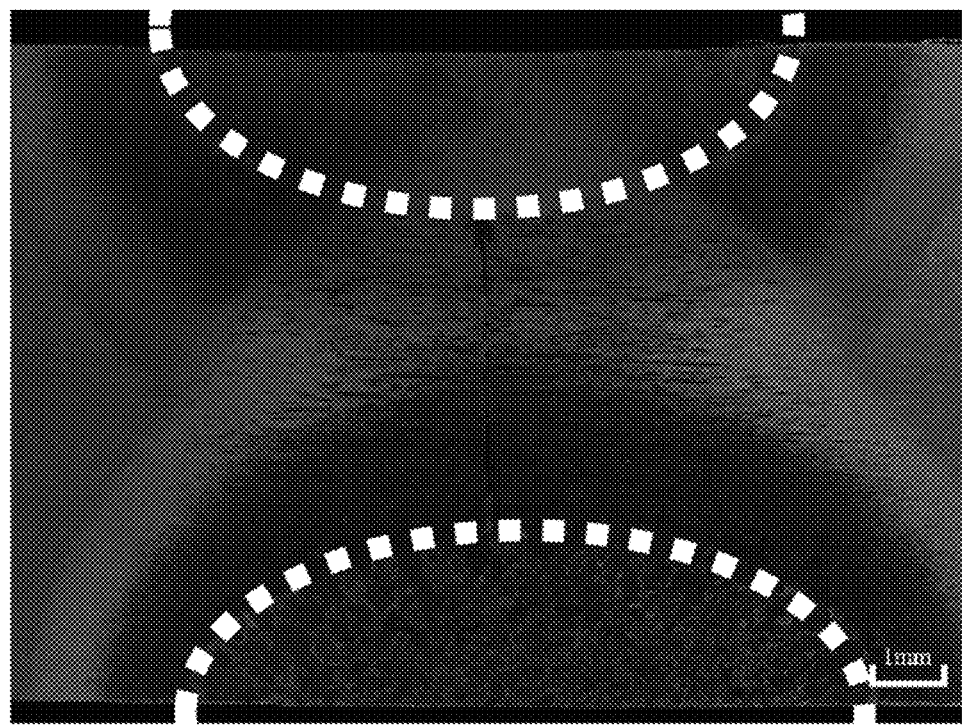
FIG. 3 depicts a cross-sectional view of two jointed workpieces of group B00 by TIG welding process without any TIG welding fluxes. The weld bead of the two jointed workpieces of group B00 is dashed circle.
Figure 4:
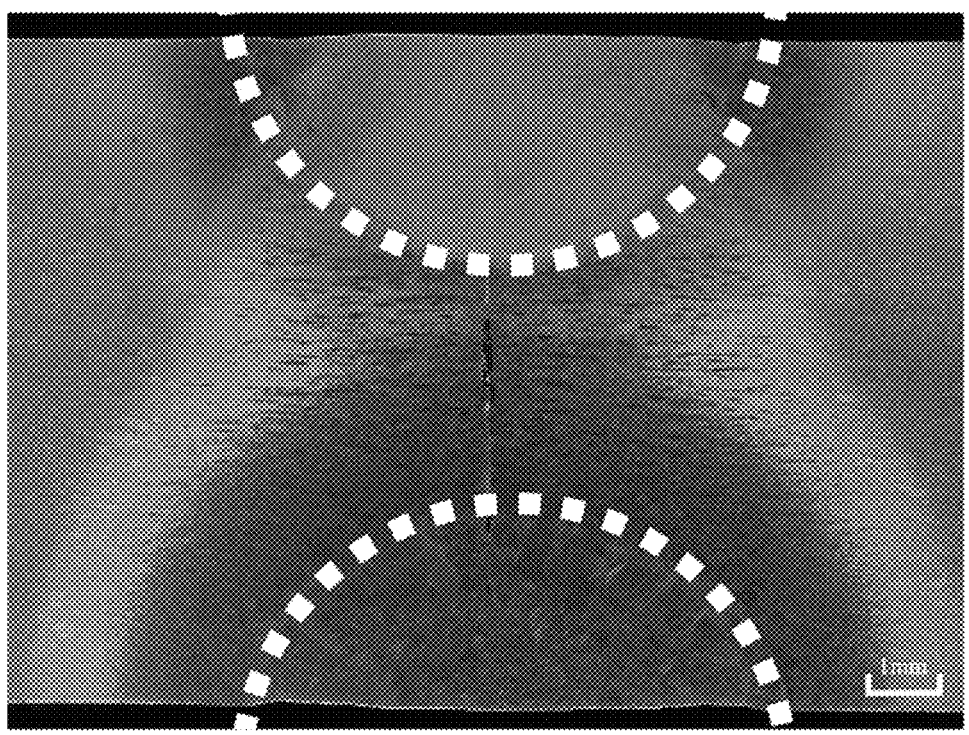
FIG. 4 depicts a cross-sectional view of two jointed workpieces of group B03 by the TIG welding process utilizing the TIG welding flux of group A03. The weld bead of the two jointed workpieces of group B03 is dashed circle.
Figure 5:
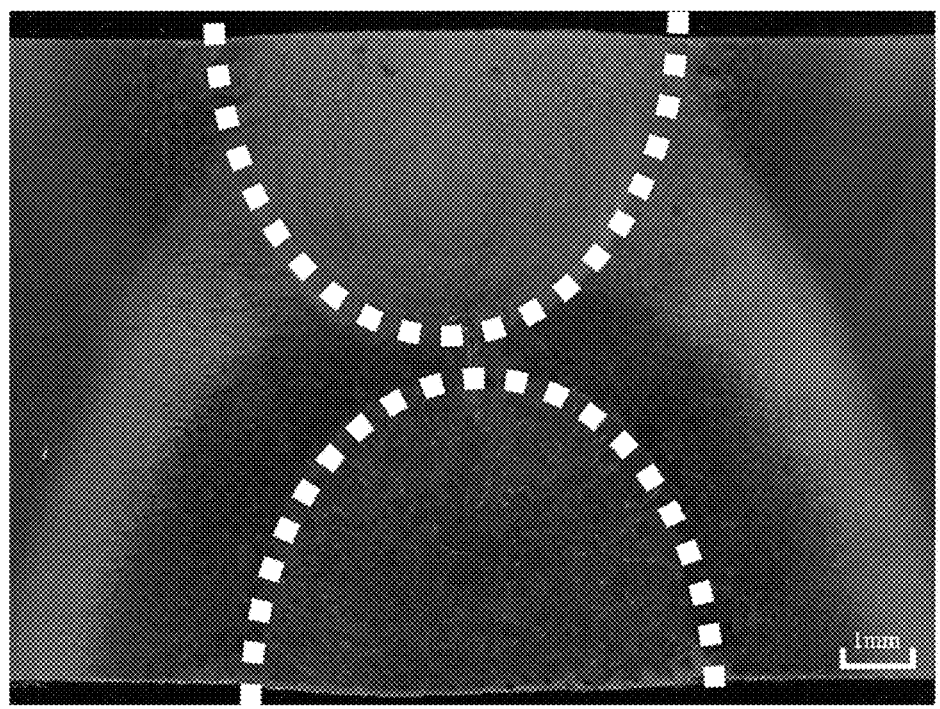
FIG. 5 depicts a cross-sectional view of two jointed workpieces of group B09 by the TIG welding process utilizing the TIG welding flux of group A09. The weld bead of the two jointed workpieces of group B09 is dashed circle.
Figure 6:
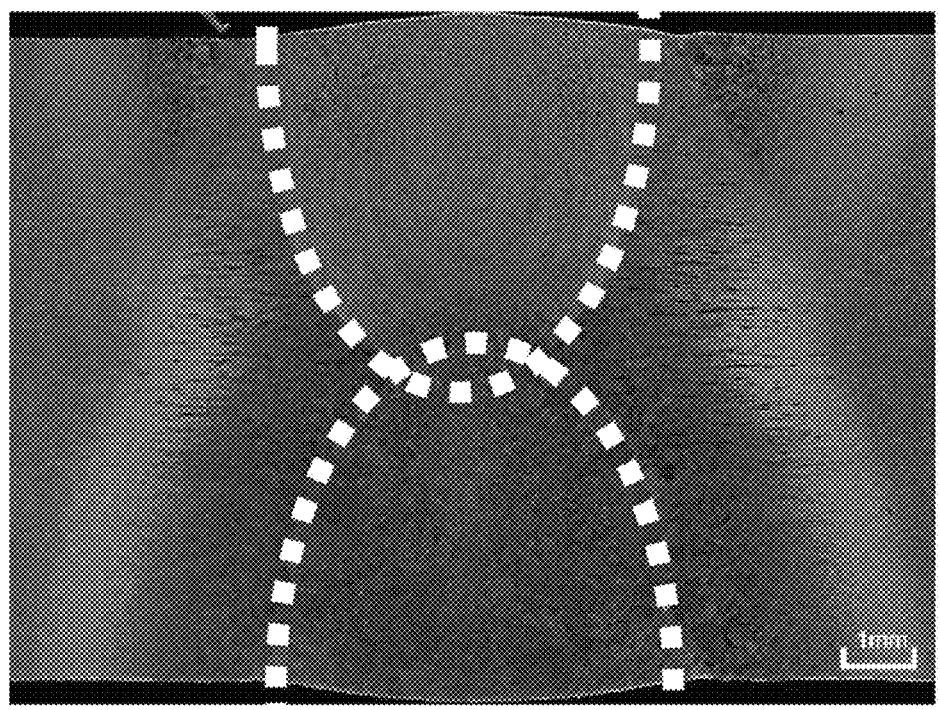
FIG. 6 depicts a cross-sectional view of two jointed workpieces of group B13 by the TIG welding process utilizing the TIG welding flux of group A13. The weld bead of the two jointed workpieces of group B13 is dashed circle.

Referring to FIGS. 1 and 2, the TIG welding flux is melted by a tungsten electrode E to form a welding pool between sides 11, 11' of the two chromium-molybdenum steel workpieces 1, 1'. The welding pool is then cooled to form a weld bead 12, obtaining the two jointed workpieces of groups B01-B14. In addition, the two jointed workpieces of group B00 is obtained by the TIG welding procedure without any TIG welding fluxes.

In the TIG welding procedure, the welding current is set as 180 A, the welding speed is set as 50 mm/min, the flow rate of the shielding gas is set as 8 L/min, the tungsten electrode E is selected as EWLa-2 (φ 3.2 mm), the grinding angle of the tungsten electrode E is set as 60°, and the contact tip-to-work distance (that is, the distance between the tip of the tungsten electrode E and the surface of the two chromium-molybdenum steel workpieces 1, 1') is set as 2 mm.

After the TIG welding procedure, cross sections of the two jointed workpieces of groups B00-B14 are obtained. The weld depth D and the bead width W of the resultant weld bead 12 are also recorded (referring to FIG. 2, an upper weld bead 12 has a weld depth D1 and a bead width W1, and a lower weld bead 12 has a weld depth D2 and a bead width W2, respectively), and the weld D/W ratio of groups B00-B14 is calculated. The weld depth D1 and the bead width W1 of the upper weld bead 12, as well as the weld depth D2 and the bead width W2 of the lower weld bead 12, of the two jointed workpieces of groups B0-B14, and the calculated weld D/W ratio of the upper weld bead 12 and of the lower weld bead 12 are recorded in TABLE 2. The average of the weld D/W ratios of the upper weld bead 12 and of the lower weld bead 12 are also recorded in TABLE 2.

TABLE 2

| | Weld Depth (mm) | | Bead Width (mm) | | Weld D/W Ratio | | |
|---|---|---|---|---|---|---|---|
| Group | D1 | D2 | W1 | W2 | D1/W1 | D2/W2 | Average |
| B00 | 2.65 | 2.95 | 10.21 | 10.85 | 0.26 | 0.27 | 0.27 |
| B01 | 3.31 | 3.71 | 10.32 | 10.80 | 0.32 | 0.34 | 0.33 |
| B02 | 3.23 | 3.63 | 9.02 | 10.08 | 0.36 | 0.36 | 0.36 |

TABLE 2-continued

| Group | Weld Depth (mm) | | Bead Width (mm) | | Weld D/W Ratio | | |
|---|---|---|---|---|---|---|---|
| | D1 | D2 | W1 | W2 | D1/W1 | D2/W2 | Average |
| B03 | 3.65 | 3.31 | 8.55 | 8.51 | 0.43 | 0.39 | 0.41 |
| B04 | 4.39 | 4.21 | 8.51 | 8.53 | 0.52 | 0.49 | 0.50 |
| B05 | 4.02 | 3.80 | 8.60 | 8.24 | 0.47 | 0.46 | 0.46 |
| B06 | 4.84 | 5.08 | 11.44 | 12.32 | 0.42 | 0.41 | 0.42 |
| B07 | 4.76 | 4.48 | 7.85 | 7.77 | 0.61 | 0.58 | 0.59 |
| B08 | 4.53 | 4.77 | 7.82 | 7.64 | 0.58 | 0.62 | 0.60 |
| B09 | 4.56 | 4.98 | 7.81 | 7.85 | 0.58 | 0.63 | 0.61 |
| B10 | 5.65 | 5.61 | 7.01 | 6.99 | 0.81 | 0.80 | 0.80 |
| B11 | 5.62 | 5.68 | 6.79 | 7.03 | 0.83 | 0.81 | 0.82 |
| B12 | 5.50 | 5.44 | 6.39 | 6.47 | 0.86 | 0.84 | 0.85 |
| B13 | 5.60 | 5.46 | 6.25 | 6.35 | 0.90 | 0.86 | 0.88 |
| B14 | 5.68 | 5.76 | 6.41 | 6.63 | 0.89 | 0.87 | 0.88 |

FIGS. 3-6 show the cross sections of the two jointed workpieces of groups B00, B03, B09 and B13, respectively, and only the weld bead 12 of the two jointed workpieces of group B13 completely penetrates the two jointed workpieces. Moreover, referring to TABLE 2, compared to the weld bead 12 of the two jointed workpieces of groups B01-B09, the weld bead 12 of the two jointed workpieces of groups B10-B14 has an increased weld depth D and a decreased bead width W. The weld D/W ratio of the weld bead 12 of the two jointed workpieces of groups B11-B14 is more than or equal to 0.8, and even up to 0.88. Thus, relative smaller HAZ can be formed, reducing the risk of problems such as thermal deformation and residual stress of the two jointed workpieces.

Accordingly, the TIG welding flux for chromium-molybdenum steel can be used with TIG welding procedure, and thus the two chromium-molybdenum steel workpieces can be jointed to form two jointed workpieces. The weld bead between the two jointed workpieces has a weld D/W ratio (weld depth/bead width ratio) more than or equal to 0.8. Therefore, heat-affected zone (HAZ) formed in the two chromium-molybdenum steel workpieces are reduced, decreasing the risk of thermal deformation and residual stress of the two jointed workpieces.

In addition, for thicker workpieces (such as that with a thickness above 3 mm), the formation of bevel faces of the two chromium-molybdenum steel workpieces can also be omitted, solving the problems such as the decrease of mechanical strength and the large HAZ due to the formation of the bevel faces of the two chromium-molybdenum steel workpieces. Moreover, omitting the formation of the bevel faces of the two chromium-molybdenum steel workpieces can also reduce welding time and manufacturing costs.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A tungsten inert gas (TIG) welding flux for chromium-molybdenum steel, comprising: 30-44 wt % of silicon dioxide ($SiO_2$), 20-35 wt % of manganese (IV) oxide ($MnO_2$), 14-24 wt % of chromium (III) oxide ($Cr_2O_3$), 9-19 wt % of nickel (III) oxide ($Ni_2O_3$), 7-14 wt % of molybdenum trioxide ($MoO_3$) and 5-10 wt % of calcium fluoride ($CaF_2$).

2. The TIG welding flux for chromium-molybdenum steel as claimed in claim 1, wherein the TIG welding flux for chromium-molybdenum steel comprises a plurality of powdered particles each having a diameter between 50-90 μm.

3. A method of using a tungsten inert gas (TIG) welding flux for chromium-molybdenum steel, comprising:
    dispersing the TIG welding flux for chromium-molybdenum steel in acetone, forming a paste-like slurry, wherein the TIG welding flux for chromium-molybdenum steel comprises 30-44 wt % of silicon dioxide ($SiO_2$), 20-35 wt % of manganese (IV) oxide ($MnO_2$), 14-24 wt % of chromium (III) oxide ($Cr_2O_3$), 9-19 wt % of nickel (III) oxide ($Ni_2O_3$), 7-14 wt % of molybdenum trioxide ($MoO_3$) and 5-10 wt % of calcium fluoride ($CaF_2$);
    spreading the paste-like slurry on surfaces of two workpieces of chromium-molybdenum steel; and
    performing a TIG welding process to join the two workpieces of chromium-molybdenum steel into a welded assembly.

4. The method of using the TIG welding flux for chromium-molybdenum steel as claimed in claim 3, wherein the TIG welding process is a double-sided butt welding process.

5. The method of using the TIG welding flux for chromium-molybdenum steel as claimed in claim 4, wherein in the TIG welding procedure, a welding current is set as 180 A, a welding speed is set as 50 mm/min, a flow rate of a shielding gas is set as 8 L/min, a tungsten electrode is as EWLa-2, a grinding angle of the tungsten electrode is set as 60°, and a contact tip-to-work distance is set as 2 mm.

6. The method of using the TIG welding flux for chromium-molybdenum steel as claimed in claim 3, wherein the two workpieces of chromium-molybdenum steel each have a thickness above 3 mm.

7. The method of using the TIG welding flux for chromium-molybdenum steel as claimed in claim 3, wherein the two workpieces of chromium-molybdenum steel each comprise 0.33-0.38 wt % of carbon (C), 0.15-0.35 wt % of silicon (Si), 0.60-0.85 wt % of manganese (Mn), ≤0.03 wt % of phosphorus (P), ≤0.03 wt % of sulfur(S), 0.9-1.2 wt % of chromium (Cr), 0.15-0.30 wt % of molybdenum (Mo) and ≤0.3 wt % of cupper (Cu), with the balance being iron (Fe).

* * * * *